US009986720B2

(12) United States Patent
DeGreeff et al.

(10) Patent No.: US 9,986,720 B2
(45) Date of Patent: Jun. 5, 2018

(54) MIXED ODOR DELIVERY DEVICE (MODD)

(71) Applicants: Lauryn E. DeGreeff, Washington, DC (US); Michael P. Malito, Washington, DC (US); Andrew Brandon, Williamsport, PA (US); Christopher J. Katilie, Washington, DC (US)

(72) Inventors: Lauryn E. DeGreeff, Washington, DC (US); Michael P. Malito, Washington, DC (US); Andrew Brandon, Williamsport, PA (US); Christopher J. Katilie, Washington, DC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 191 days.

(21) Appl. No.: 14/978,040

(22) Filed: Dec. 22, 2015

(65) Prior Publication Data

US 2016/0174525 A1 Jun. 23, 2016

Related U.S. Application Data

(60) Provisional application No. 62/095,946, filed on Dec. 23, 2014.

(51) Int. Cl.
*A01K 15/02* (2006.01)
(52) U.S. Cl.
CPC .................................. *A01K 15/02* (2013.01)
(58) Field of Classification Search
CPC ... A01K 15/02; F41H 11/132; G01N 33/0057

(Continued)

(56) References Cited

U.S. PATENT DOCUMENTS 4,624,779 A * 11/1986 Hurner ............... B01D 17/0208
                                                            210/180
4,787,988 A * 11/1988 Bertoncini ............. B01D 29/05
                                                            210/406

(Continued)

FOREIGN PATENT DOCUMENTS

WO   WO-2014181118 A1 * 11/2014 ............. B65D 11/04

OTHER PUBLICATIONS

Adams, G.J. et al.; "Sleep, Work, and the effects of shift work in drug detector dogs *Canis familiars*"; Applied Animal Behaviour Science; vol. 41; pp. 115-126; (1994).

(Continued)

*Primary Examiner* — Tien Q Dinh
*Assistant Examiner* — Brady W Frazier
(74) *Attorney, Agent, or Firm* — U.S. Naval Research Laboratory; Dawn C. Russell

(57) ABSTRACT

An apparatus for training canines to detect complex hazardous substances from an odor mixture developed from at least two separated material components having at least two separated odors respectively. The training apparatus has a chamber base unit having at least two vial wells configured to hold separate containers of the material components and a chamber top unit having a first side facing the chamber base and a second side opposite the first side. The first side of the chamber top unit and the chamber base unit define a primary vapor mixing chamber in fluid communication with the vial wells. A mechanical seal between the chamber top and the chamber base seals the primary vapor mixing chamber. A passageway extends through the chamber top unit connecting the primary vapor mixing chamber to the second side of the chamber top unit.

21 Claims, 21 Drawing Sheets

(58) Field of Classification Search
USPC ............ 119/711, 712; 239/8, 57, 58, 59, 60, 239/102.1; 261/16
See application file for complete search history.

(56) References Cited

U.S. PATENT DOCUMENTS

| | | | | |
|---|---|---|---|---|
| 4,898,294 | A * | 2/1990 | Jennings | A47J 41/0044 220/592.09 |
| 5,011,779 | A * | 4/1991 | Maimon | B01L 3/0293 422/504 |
| 5,988,415 | A * | 11/1999 | White | B65D 39/06 141/320 |
| 6,244,518 | B1 * | 6/2001 | Pogue | A01M 29/12 215/204 |
| 6,923,426 | B1 * | 8/2005 | Pino | F16K 31/3855 137/218 |
| 7,754,165 | B2 * | 7/2010 | Erden | B01J 3/04 422/129 |
| 8,776,731 | B1 * | 7/2014 | Curtis | A01K 15/02 119/712 |
| 9,049,845 | B2 | 6/2015 | Albuquerque | |
| 2001/0047771 | A1 * | 12/2001 | Bulanda | A01K 15/02 119/712 |
| 2006/0174843 | A1 * | 8/2006 | Poyner | A01K 15/027 119/712 |
| 2014/0311420 | A1 * | 10/2014 | Albuquerque | A01K 15/02 119/712 |
| 2016/0081302 | A1 * | 3/2016 | Hare | A01K 15/02 119/712 |

OTHER PUBLICATIONS

DeGreeff, L., et al., "Creation of training aids for human remains detection canines utilizing non-contact, dynamic airflow volatile concentration technique", Forensic Science International, vol. 217, pp. 32-38, Apr. 2012, available online Oct. 21, 2011.

DeGreeff, L., "Development of a Dynamic Headspace Concentration Technique for the Non-Contact Sampling of Human Odor Samples and the Creation of Canine Training Aids", Thesis, Florida International University, Nov. 2011, pp. iv-xvi and 1-216.

DeGreeff, L., Rogers, D.A., Katilie, C., Johnson, K., and Rose-Pehrsson, S.; "Technical note: Headspace analysis of explosive compounds using a novel sampling chamber", Forensic Science International, vol. 248, pp. 55-60, Mar. 2015, available online Dec. 30, 2014.

Faust, A. A. et al.; "Observations of Military Exploitation of Explosives Detection Technologies"; Proceedings of SPIE: Detection and Sensing of Mines, Explosive Objects, and Obscured Targets XVI; (Apr. 25-29, 2011); Session 8; vol. 8017 16); pp. 1-12.

Furton, K.G. et al.; "The scientific foundation and efficacy of the use of canines as chemical detectors for explosives"; Talanta; vol. 54, Issue 3, pp. 487-500, May 2001.

Gazit, I. et al.; "Explosives detection by sniffer dogs following strenuous physical activity"; Applied Animal Behaviour Science; vol. 81, No. 2, pp. 149-161; Apr. 2003.

Harper, R. et al.; Identification of dominant odor chemicals emanating form explosives for use in developing optimal training aid combinations and mimics for canine detection; Talanta; vol. 67, No. 2, pp. 313-327; Aug. 2005; available online Jul. 1, 2005.

Herstik, M.; "The False Alert: Reasons and Remedies; Working Canines"; The Detonator; pp. 43-45; vol. 37, No. 5, (2010); [retrieved on Dec. 26, 2013]. Retrieved from the internet: <URL: http://www.detectiondogs.com/authorship.html>.

Johnston, J.M.; "Canine Detection Capabilities: Operational Implications of Recent R & D Findings"; Institute for Biological Detection Systems, Auburn University; pp. 1-7; (Jun. 1999); [retrieved on Feb. 26, 2016]; [retrieved from URL: <http://barksar.org/K-9_Detection_Capabilities.pdf>].

Kopp, C.; "Defeating Improvised Explosive Devices"; Defence Today; vol. 7, No. 6; pp. 12-14; (Sep. 14, 2009).

Kopp, C.; "Technology of Improvised Explosive Devices"; Defence Today; vol. 6, No. 3, pp. 46-48; 2007.

Laing, D.G., et al., "The Capacity of Humans to Identify Odors in Mixtures", Physiology & Behavior, vol. 46, pp. 809-814, 1989.

Lazarowski, L., et al.; "Explosives detection by military working dogs: Olfactory generalization from components to mixtures"; Applied Animal Behaviour Science; vol. 151; Feb. 2014; pp. 84-93; available online Dec. 1, 2013.

Laska, M., "Discriminating parts from the whole: determinants of odor mixture perception in squirrel monkeys, *Saimiri sciureus*", J. Comp. Physiol. A, vol. 173, pp. 249-256, 1993.

Lit, L. et al.; "Handler beliefs affect scent detection dog outcomes"; Animal Cognition; vol. 14; pp. 387-394; May 2011; published online Jan. 12, 2011.

Östmark, H., et al.; "Vapor Pressure of Explosives: A Critical Review"; Propellants, Explosives, Pyrotechnics; vol. 37; pp. 12-23; Feb. 2012.

Wilson, C.; "Improvised Explosive Devices (IEDs) in Iraq: Effects and Countermeasures"; Congressional Research Service, The Library of Congress, Report for Congress; Sep. 25, 2006; 7 pages.

\* cited by examiner

MIXED ODOR DELIVERY DEVICE (MODD)

CROSS-REFERENCE TO RELATED APPLICATIONS

This application is a non-provisional under 35 USC 119(e) of, and claims the benefit of U.S. provisional application Ser. No. 62/095,946, the entire disclosure of which is incorporated herein.

BACKGROUND OF THE INVENTION

1. Technical Field

This disclosure relates to detection of explosives and other multi-component substances. More particularly, the disclosure describes an apparatus for training scent detecting working dogs to detect explosives and other materials.

2. Related Technology

Scent detecting dogs are routinely trained to detect certain substances, such as drugs or explosives, by using samples of the actual substance of interest. In some instances, the explosive or substance is made up two or more elements combined (each element having separate and distinct odors) which are mixed to produce the compound. However, the use of samples of the actual explosive mixtures raises numerous safety issues. Attempts to train scent detecting dogs using pseudoscents, inert substances, or individual components of a normally mixed/combined compound have not been very effective. The Department of Defense does not use pseudoscents or mimics. U.S. Pat. No. 9,049,845 to Albuquerque, the entirety of which is incorporated by reference herein, discloses an apparatus useful for training dogs to detect complex hazardous substances by mixing the vapors within the device, while keeping the elements separated.

BRIEF SUMMARY

An apparatus for training canines to detect complex hazardous substances from an odor mixture developed from at least two separated material components. In one aspect, the apparatus includes a chamber base unit having at least two vial wells configured to hold the separated material components and a chamber top unit having a first side facing the chamber base and a second side opposite the first side. The first side of the chamber top unit and the chamber base unit define a primary vapor mixing chamber in fluid communication with the vial wells. A mechanical seal between the chamber top unit and the chamber base unit. The chamber top has a passageway extending from the primary vapor mixing chamber to the second side of the chamber top and allowing vapors to diffuse from the vial wells to the second side of the chamber top.

An apparatus can include a chamber base unit having at least two vial wells configured to hold the separated material components and a chamber top unit having a first side facing the chamber base and a second side opposite the first side, the first side of the chamber top unit and the chamber base unit defining a primary vapor mixing chamber in fluid communication with the vial wells, and the chamber top having a passageway extending from the primary vapor mixing chamber to the second side of the chamber top and allowing vapors to diffuse from the vial wells to the second side of the chamber top. The apparatus also includes a tube configured to be positioned within the passageway with a first end extending into the primary vapor mixing chamber, and further includes a flow restrictor having a first end with a diameter configured to fit within the passageway, and having a cap with a wider diameter at a second opposite end that extends radially outward past the circular upper edge of the passageway.

DETAILED DESCRIPTION

1. Overview

Figure 1A:
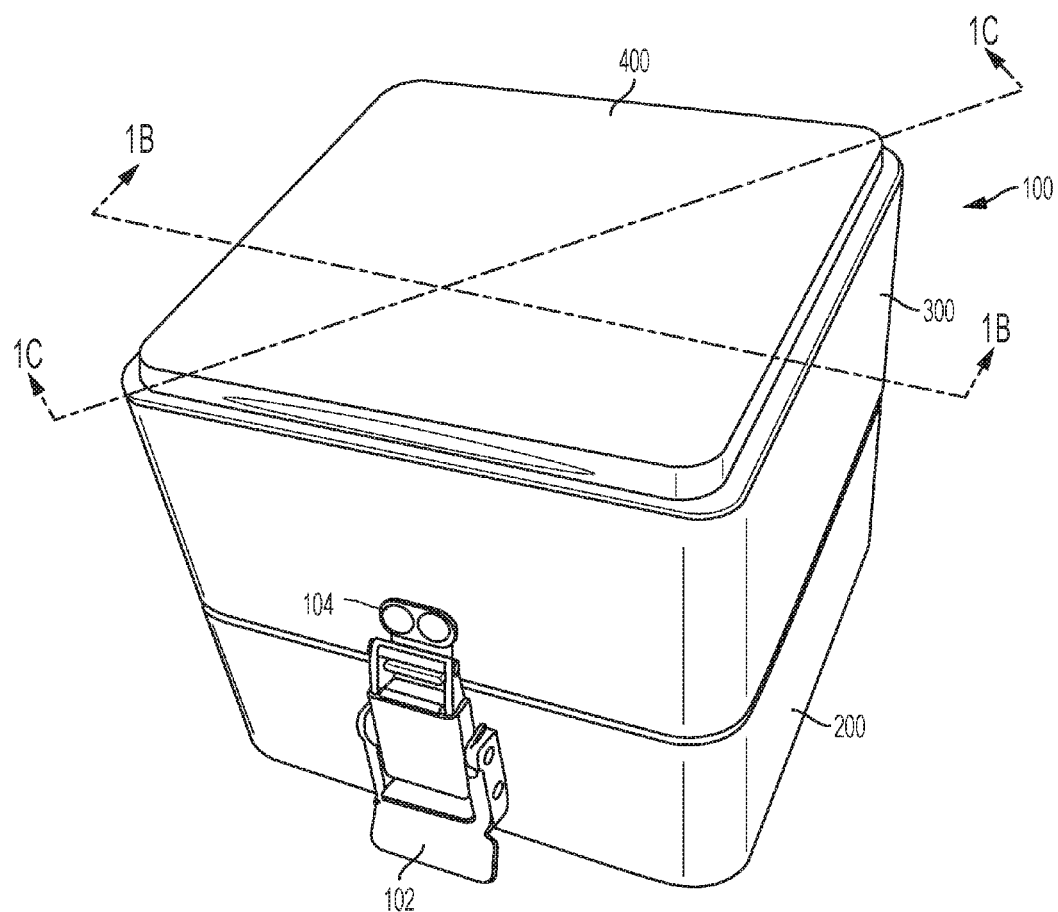
FIG. 1A is an illustration of an exemplary mixed odor delivery device.

The systems described herein are intended to safely present the odor of hazardous explosive mixtures for canine training by keeping the mixture components separated and allowing only the vapors to mix.

An example of a mixture is a binary explosive mixture that includes an oxidizer and a fuel mixture. Examples of oxiders are ammonium nitrate (AN) and potassium chlorate (KClO4). Examples of fuels are sugar, aluminum powder (Al), and fuel oil (FO). The components usually have legal uses, but when mixed create explosives. Some explosives has a low vapor pressure, which can present a challenge for detection. For example, the vapor pressure of ammonium nitrate and aluminum powder explosive mixture is $2.2 \times 10^{-6}$ mmHg at 25 degrees C., which is very low compared to the vapor pressure of TNT ($2.0 \times 10^{-4}$ mmHg).

2. Examples

FIG. 1A-1D illustrate a mixed odor delivery device 100 that includes a chamber base 200, a chamber top 300, a lid 400, an insert 350, and a flow restrictor 330.

The device 100 provides for mixing the vapors of the explosive components, and presents a reproducible, efficient, homogeneous vapor distribution to the canine.

The system holds several removable jars or vials 180 in place, separated from each other so that the liquid or solid substances within the jars or vials do not mix. The vapor from each jar or vial disperses into a surrounding mixing chamber, and travels through a narrow passageway to a second mixing chamber. When a lid or other cover is in place over the vapor outlet of the second chamber, the vapors mix further, and their concentration increase. When the lid or other cover is removed, a vapor plume that includes the mixed vapors is exposed to the exterior environment. This allows the canines to be trained to detect the particular mixed vapors, without mixing the liquid or solid components themselves.

Figure 2A:
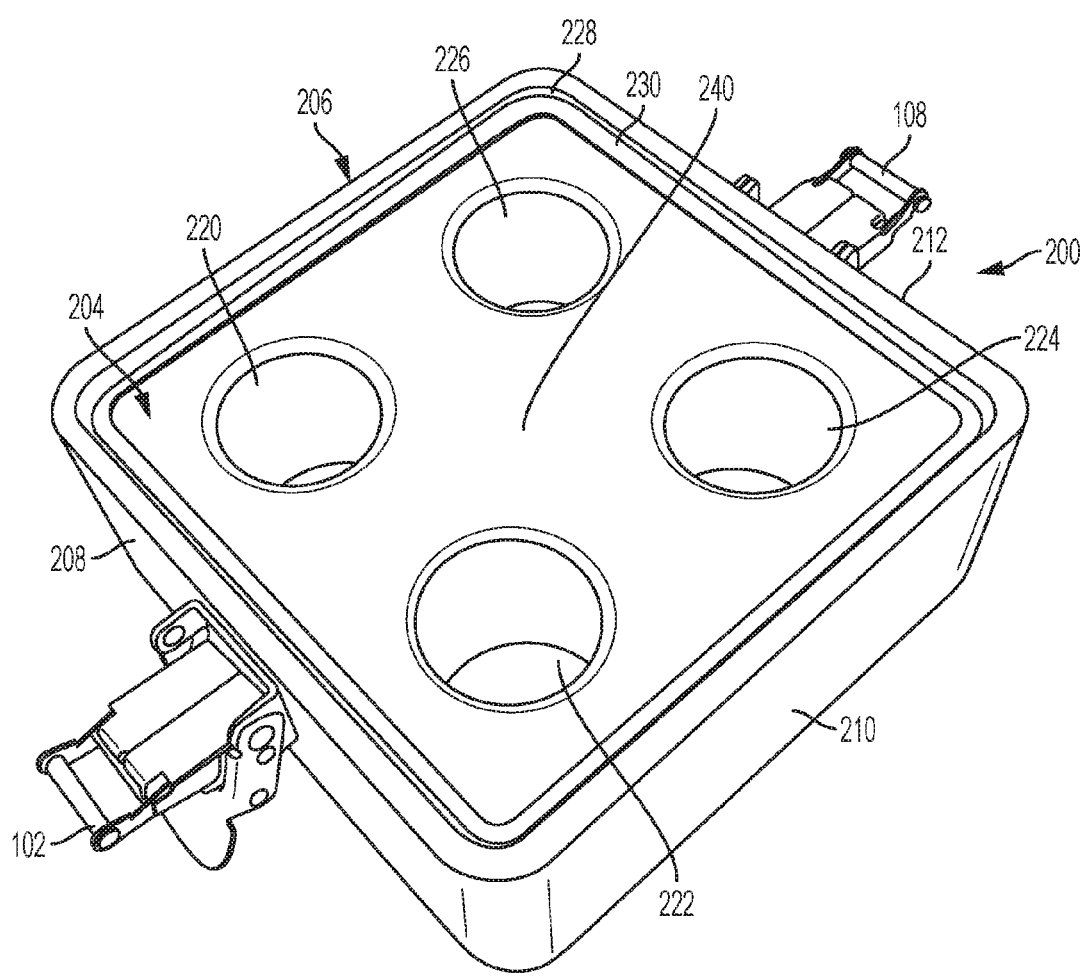
FIGS. 2A and 2B illustrate the base component of the mixed odor delivery device of FIG. 1A-1C.
Figure 2B:
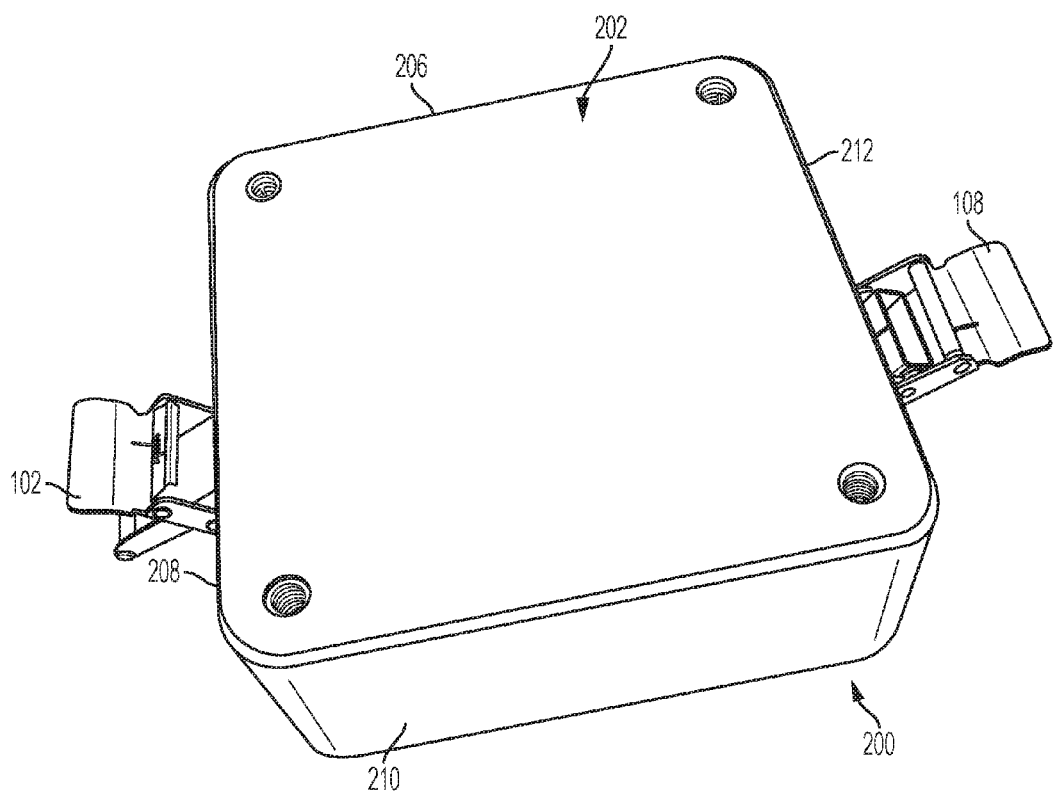

Turning next to FIGS. 2A and 2B, the chamber base unit 200 is shown in more detail. The chamber base unit 200 is a structure with a top surface 204 that includes several vial wells 220, 222, 224, 226, which are recesses in which removable jars or vials can be positioned. In this example, the chamber base unit 200 is rectangular or square in cross section, with four sides 206, 208, 210, 212. As seen in FIG. 2B, the chamber base unit 200 bottom surface can have inwardly extending metal threaded inserts that, with corresponding screws or bolts, can be used to attach the base of the device to another structure.

The four vial wells 220, 222, 224, 226 allow up to four components to be stored in jars or vials within the vial wells. It can be suitable to include fewer or more than four vial wells.

As seen in FIG. 2A, the vial wells 220, 222, 224, 226 can be arranged at approximately same radial distance from a central point 240 that is aligned directly below the passageway 342 though the top unit 300.

Figure 1B:
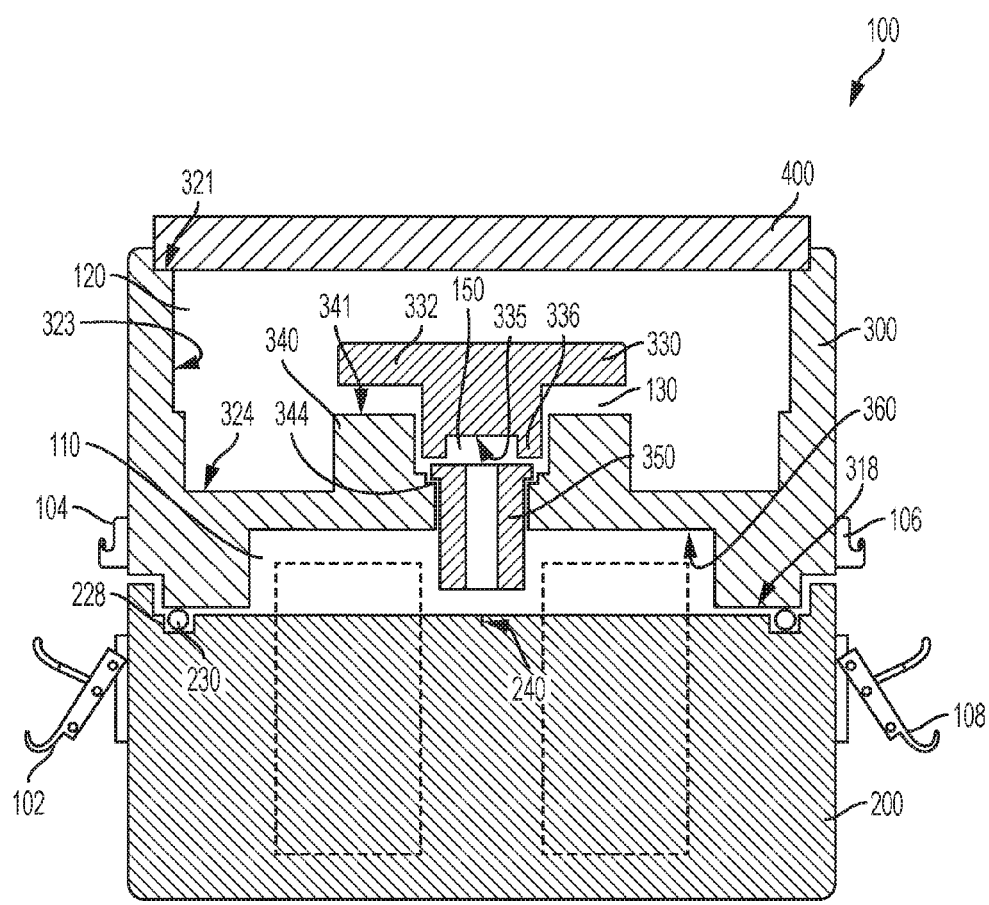
FIG. 1B is a cross sectional view of the mixed odor delivery device.
Figure 1C:
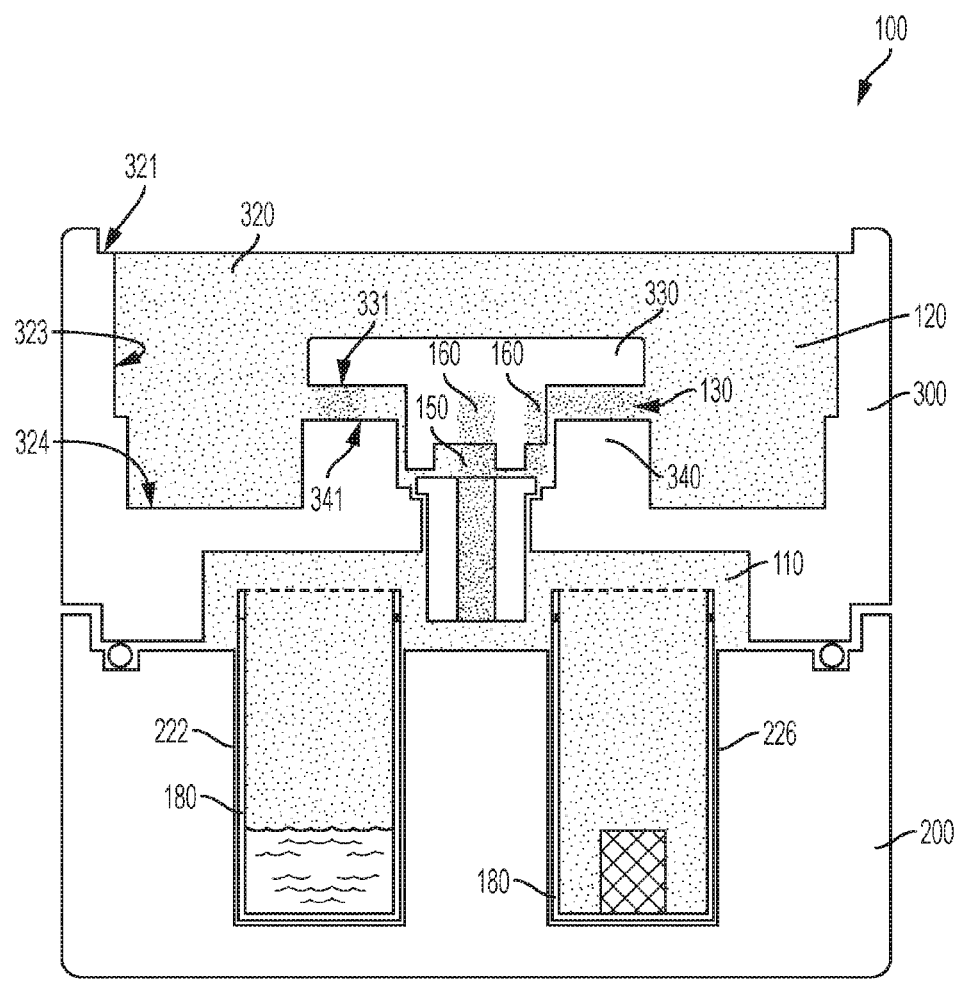
FIG. 1C is a cross sectional view of the mixed odor delivery device in operation.

The jars or vials 180, as shown in FIG. 1C, can have lids with holes through the lids to allow the vapor to escape the jar or vial. The size of the holes in the vial lids can be selected to provide a different concentration of each odor. The jars or vials can alternatively have no lids, or solid lids that intended to be completely removed when the jars or vials are placed in the base component 100. It can also be suitable to include a number of lids with different sizes and numbers of holes in the lids, to control the amount of vapor that diffuses from each of the vials, in order to vary the relative proportions of vapors in the mixture. The jars or vials 180 can have sides that extend above the top of the vial wells, so that the jars or vials can be manually inserted into and removed from the vial wells without spilling the contents.

Figure 3A:
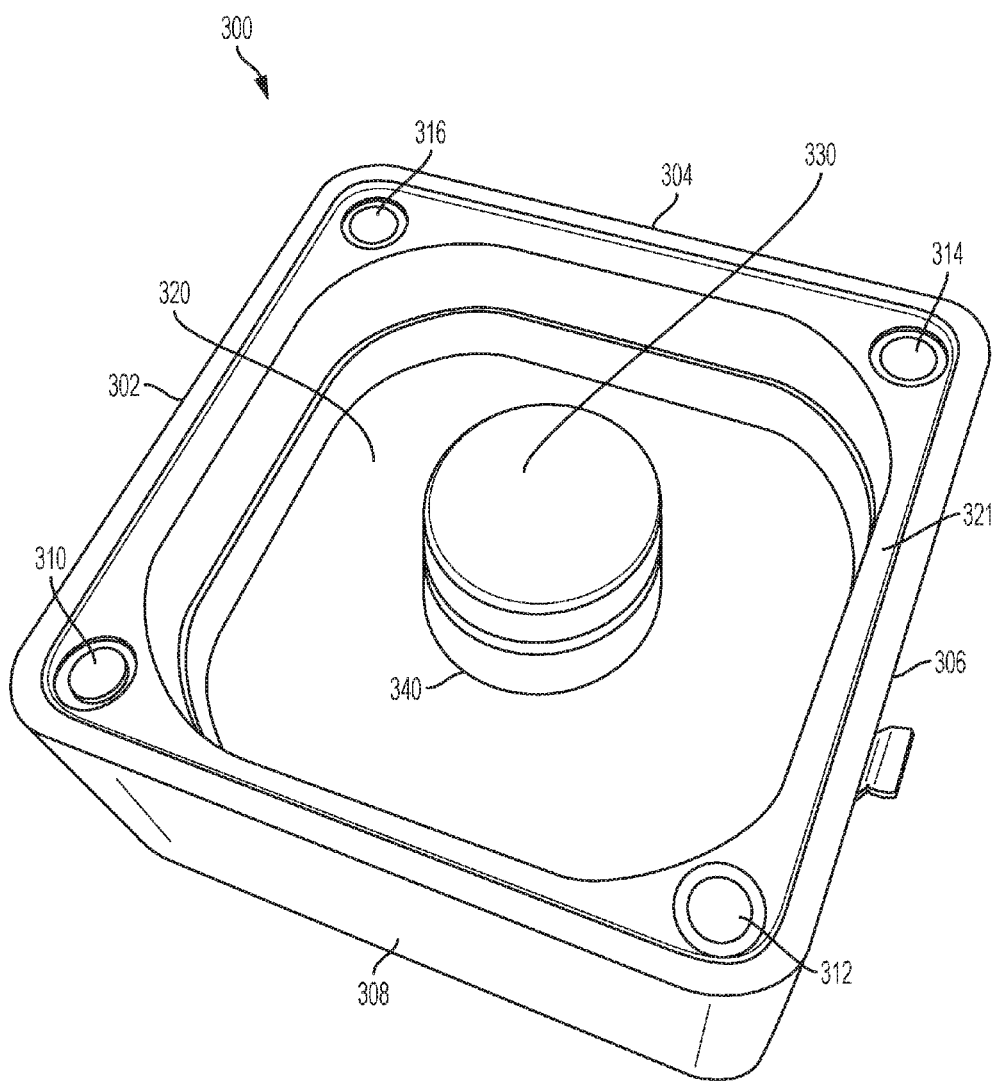
FIG. 3A-3E illustrate the upper component of the mixed odor delivery device of FIG. 1A-1C.
Figure 3B:
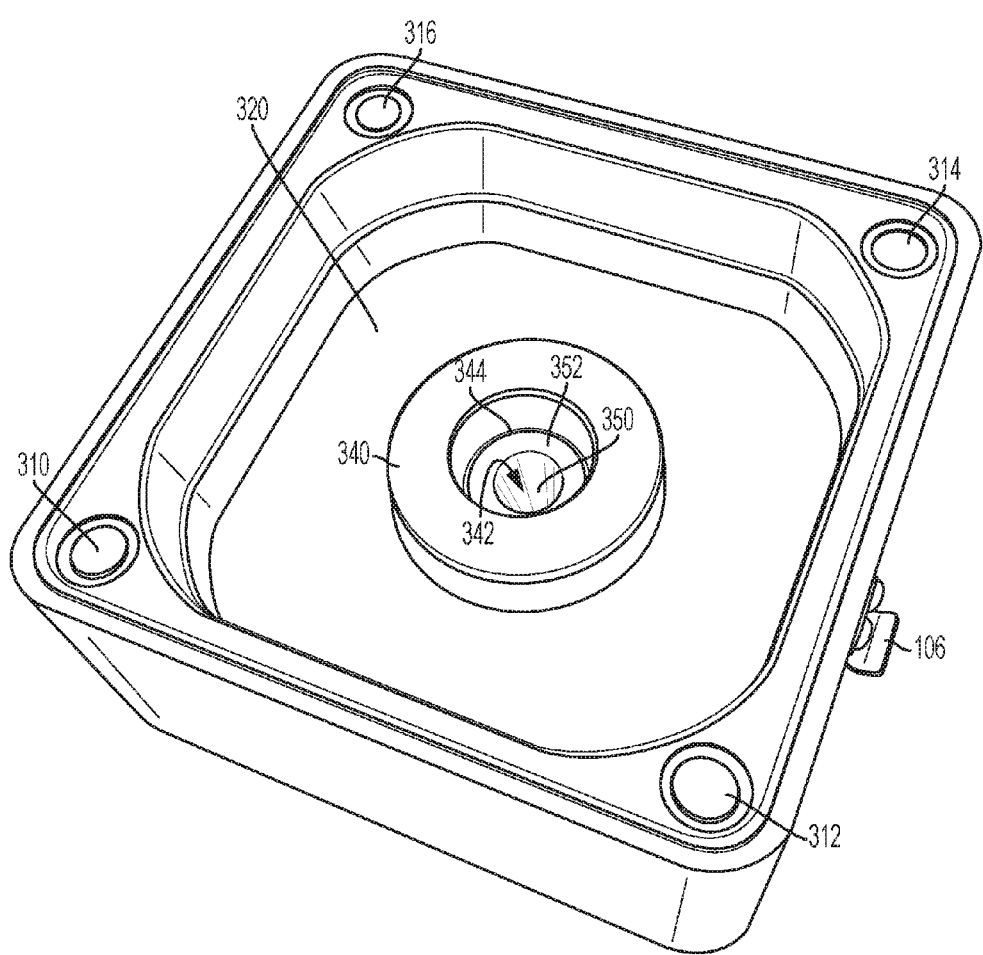
Figure 3C:
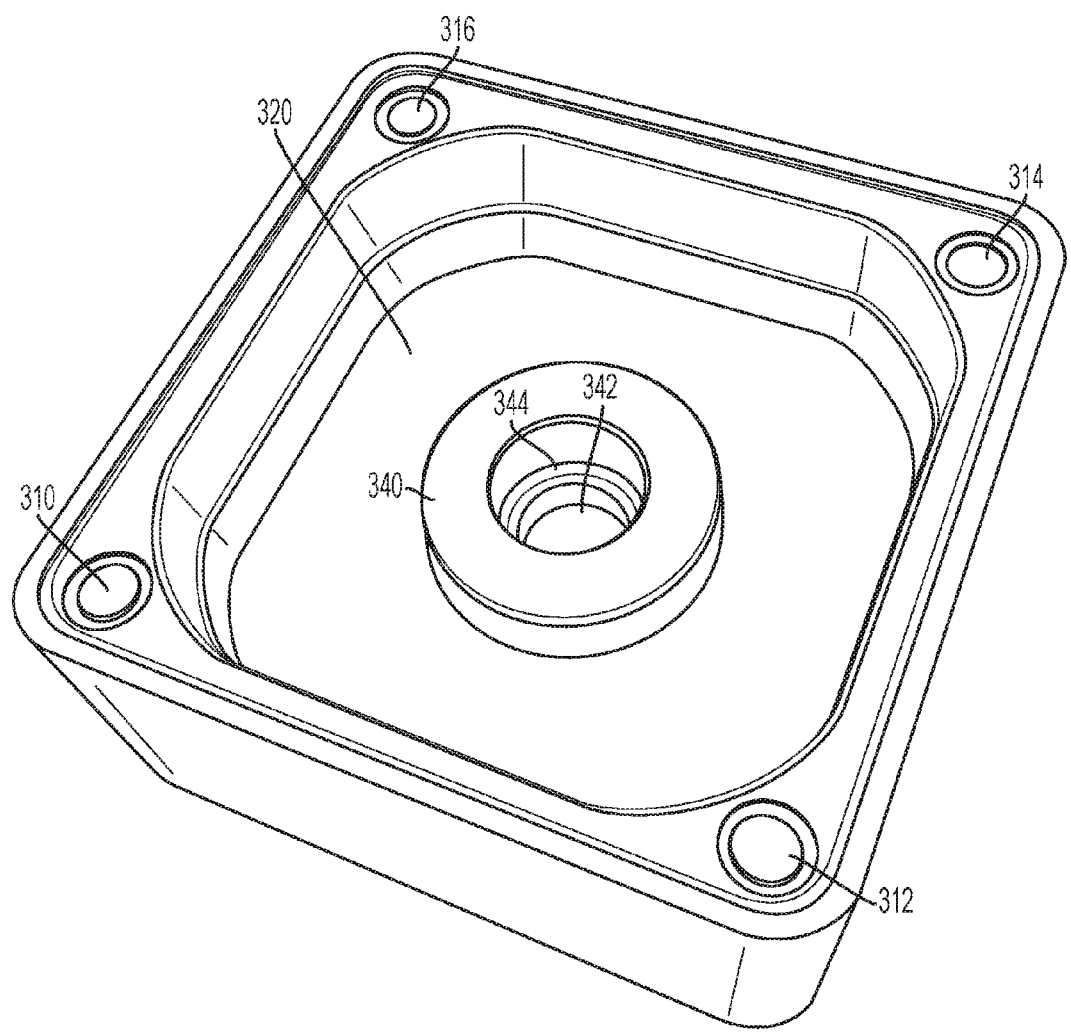
Figure 3D:
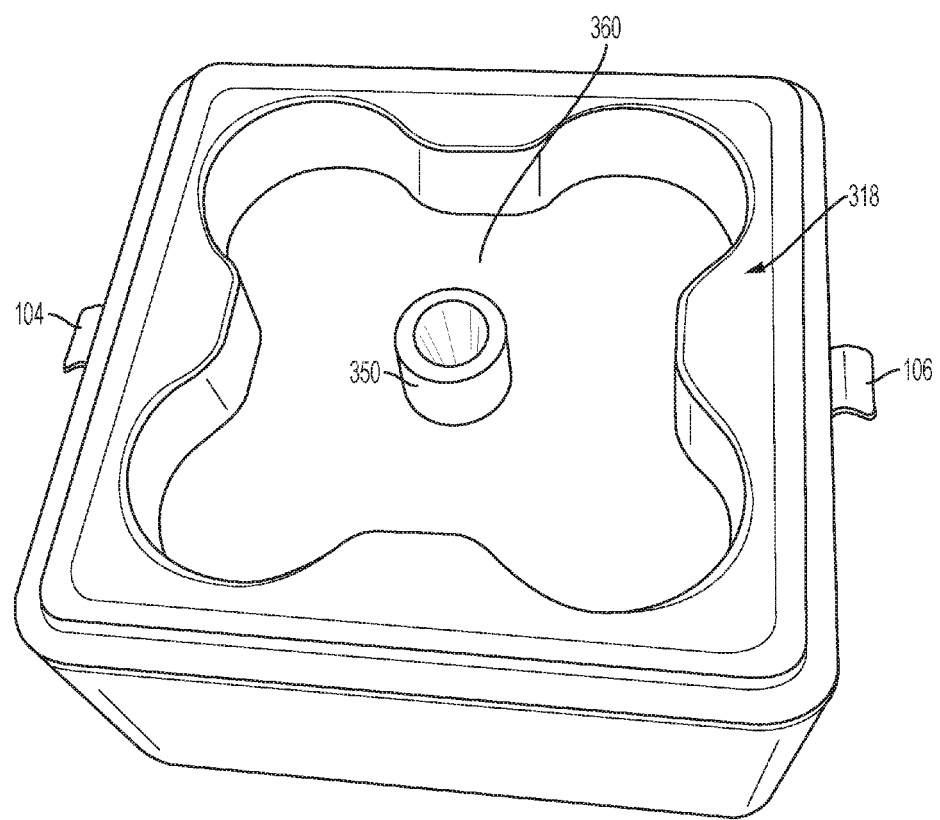
Figure 3E:
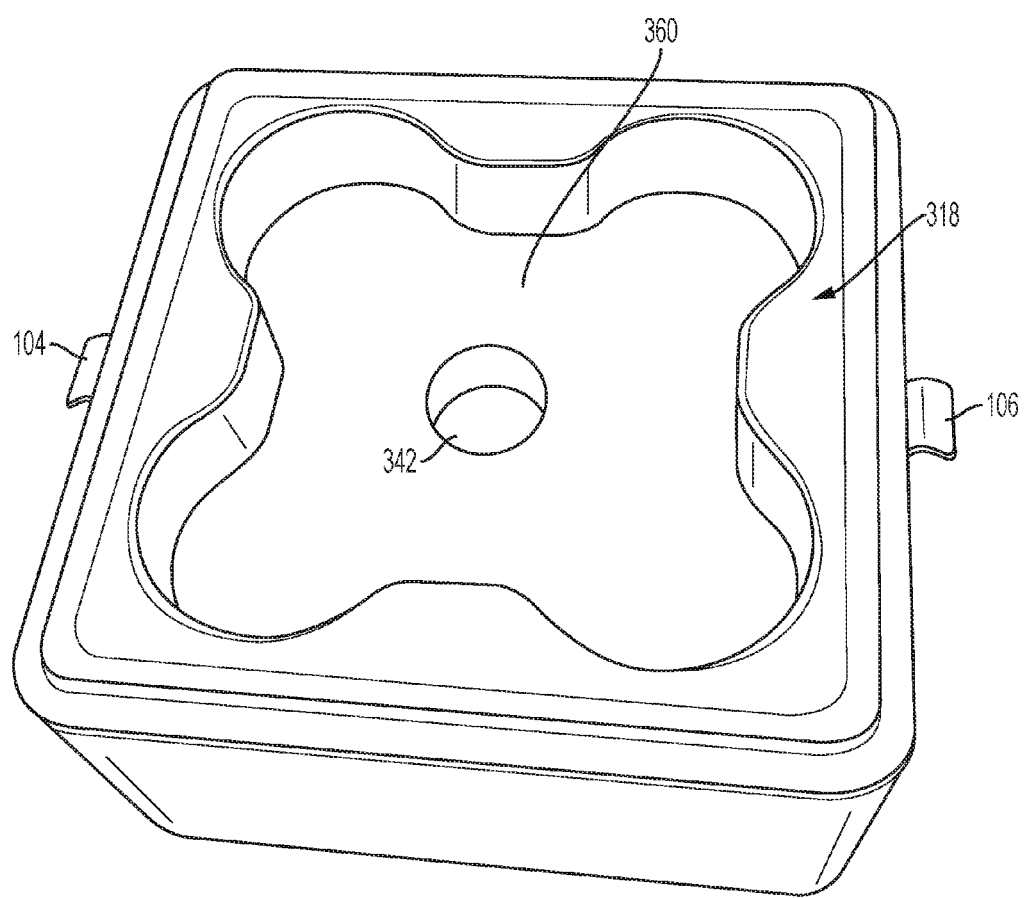

FIG. 3A shows the upper face of the chamber top unit 300 with the insert 350 and flow restrictor 330 in place. FIG. 3B shows the upper face of the chamber top unit 300 with the insert in position but without the flow restrictor. FIG. 3C shows the upper face of the chamber top unit 300 without the insert and without the flow restrictor. FIG. 3D shows the lower surface of the chamber top unit 300 with an insert in place, and FIG. 3E shows the lower surface of the chamber top unit without the insert in place.

As seen in FIG. 1B, chamber top unit 300 has a lower surface 318 that fits matingly on a ledge or shoulder in the top surface of the chamber base 200. Closure latches 102, 104, 106, 108 are positioned on two opposite sides of the device to clamp the chamber top unit 300 and the chamber base unit 200 together. The chamber top unit 300 has a recessed surface 360 on the underside facing the chamber base unit 200, so that a lower, primary vapor mixing chamber 110 is formed between the top 300 and the base 200 in which the vapors from the substances in the vials can mix.

The vapor mixing chamber 110 is identified as primary because it is the first space in which the vapors can mix encountered by the vapors diffusing from the vials in the vial wells.

A groove 228 extends completely around the outer perimeter of the base unit 200, for holding an o-ring 230 or other gasket. A tight o-ring seal is formed between the chamber top unit 300 and the base unit 200 when the latches are locked in place. In this example, each closure latch is a surface-mounted drawbolt closure latch. Other types of closure hardware may also be suitable in some applications.

The o-ring groove 228 is positioned radially outward of the mixing chamber 110 formed between the base unit 200 and the top unit 300. When the closure latches is are secured, the sealing surfaces of the base unit 200 and the top unit 300 are urged together, compressing the o-ring 230 in its groove, and preventing vapors from leaking from between the top unit and the base unit.

The opposite surface of the chamber top 300 has a recessed area 320 with outer sidewalls 323 and a bottom surface 324. The sidewalls and bottom surfaces of the recessed area 320, together with the lid 400, form a secondary vapor mixing chamber 120. A shoulder or ledge 321 is formed along the outer circumferential edge of the recessed area, shaped to receive and support the lid 400.

A centrally located vertical passageway 342 extending through the chamber top unit 300 joins the two mixing chambers. A cylindrical protrusion 340 extends upward from the bottom surface 324 of the top unit 300 surrounds the passageway 342. The top surface 341 of the cylindrical protrusion 340 forms one surface of an adjustably sized flow gap 130, as discussed in later paragraphs.

The secondary vapor mixing chamber 120 is designated as secondary in order to distinguish it from the primary mixing chamber 110 positioned on the opposite side of the chamber top unit, rather than to characterize any degree of vapor mixing that occurs in the respective mixing chambers. It is noted that the vapors can also mix within the passageway 342 that extends through the chamber top 300 and connects the primary and secondary mixing chambers.

Figure 4A:
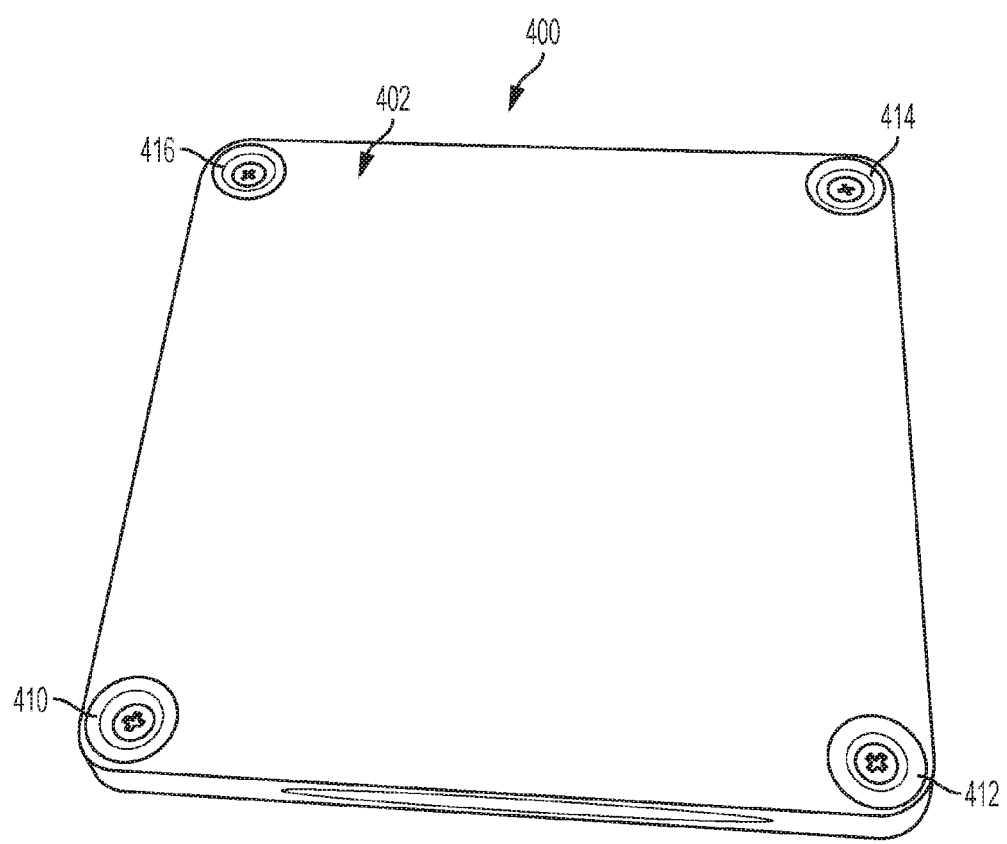
FIGS. 4A and 4B show a lid component of the mixed odor delivery device.
Figure 4B:
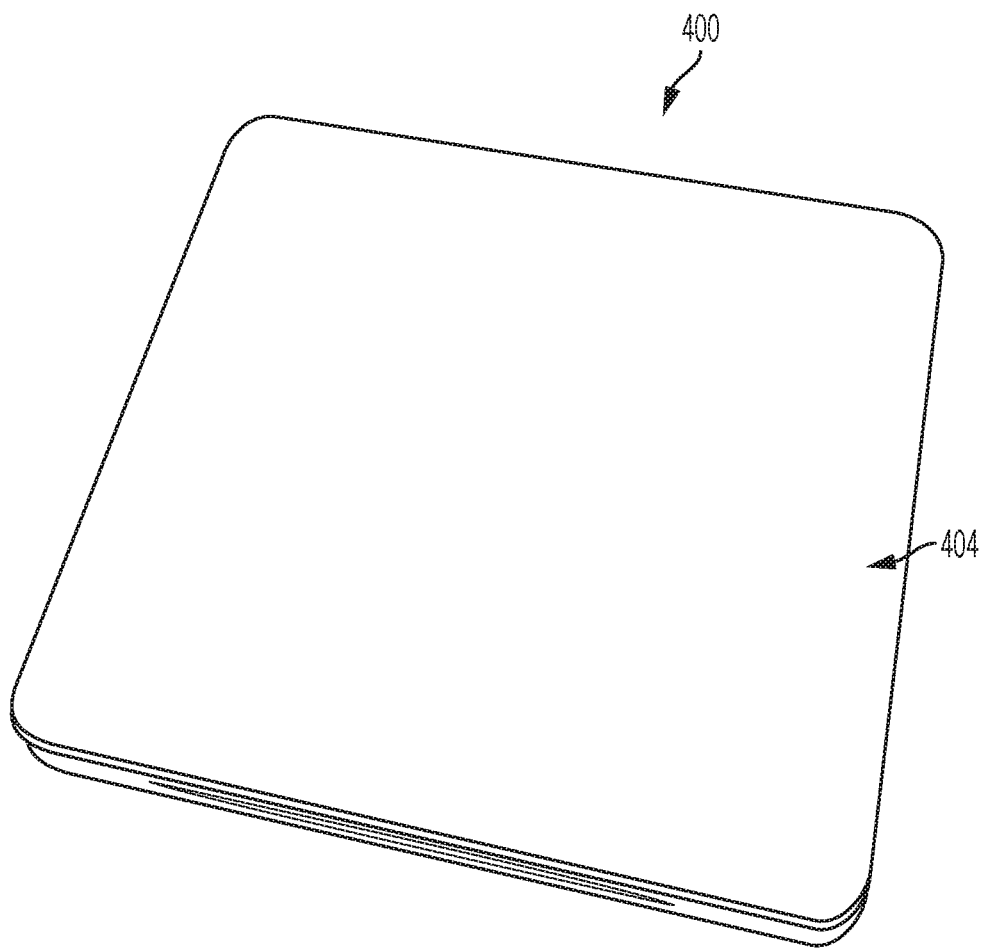

FIGS. 4A and 4B illustrate an optional lid 400. In this example, the lid 400 is positioned at the top surface of the chamber top unit 300, covering the recess in the chamber top. The recess in the chamber top unit 300 and the lid 400 define the secondary mixing chamber. The lid 400 fits partially within the chamber top unit 300, supported on a shoulder or ledge 321.

In this example, the lid 400 is held in place by magnetic catches 410, 412, 414, 416 positioned on the surface 402 of the lid that faces toward the chamber top unit 300, together with magnetic catches 310, 312, 314, 316 located at the corners of the chamber top unit 300. The magnetic catches 310-316 are positioned on the ledge or shoulder area 321. When the system is not in use, for example, during storage or transportation, the lid 400 can protect the interior from damage or contamination. During operation, after the vials are place in the vial wells, the lid 400 can be kept in place to allow the vapors to mix and accumulate in the upper mixing chamber 120. The lid can then be removed by the handler when ready to present the mixed vapor to the canine.

In other alternatives, the system 100 can include other structures for protecting the interior of the system and/or for allowing the mixed vapors to accumulate in the upper chamber. For example, a lid can be attached with a hinge or other connector, or can be removably attached with clips, clamps, screws, or other mechanical fasteners. It may also be suitable to have the lid fit completely over the chamber top unit 300, rather than to be positioned on a shoulder or ledge within a recess on the top of the chamber top unit as shown in FIG. 1B. In some applications in which it is not desired to allow the vapor to accumulate to a higher concentration, it may also be suitable to have no lid or cover for the chamber top unit 300.

Figure 5:
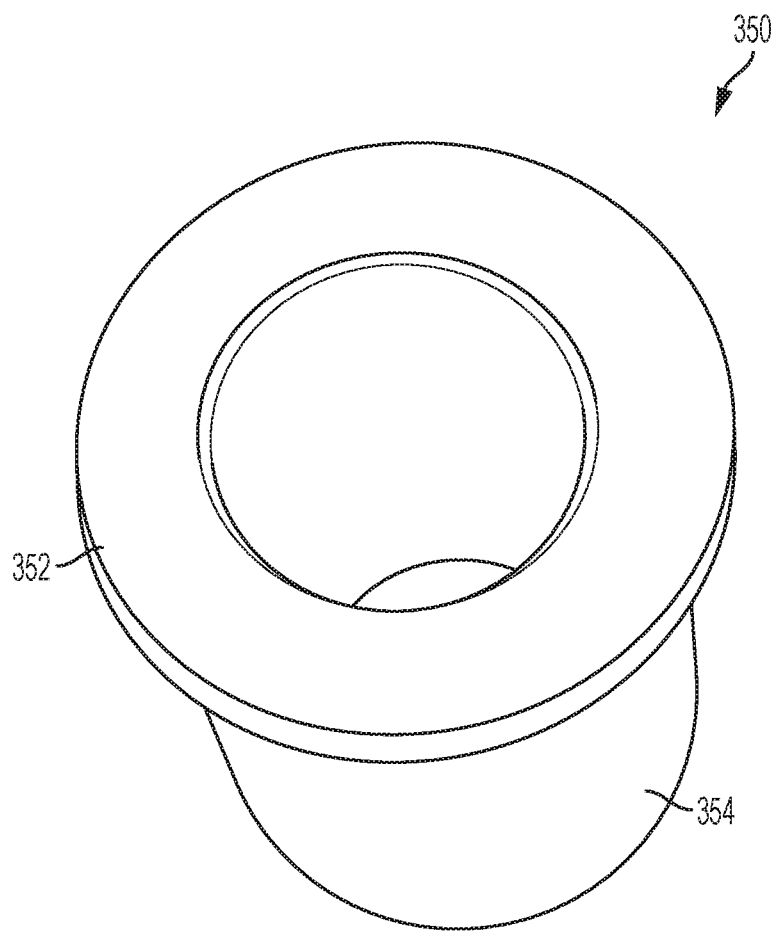
FIG. 5 shows an insert component of a mixed odor delivery device.

FIG. 5 illustrates an insert 350, shown here as a hollow cylindrical tube that fits within the cylindrical passageway 342 through the chamber top unit 300. As seen in FIG. 5, the insert has a substantially constant inner diameter. A portion of the insert has a substantially constant outer diameter, with one end of the insert having a lip 352 with a wider outer diameter.

When the system is assembled as shown in FIGS. 1B and 3B, the lip 352 rests on a shoulder 344 formed in the cylindrical passageway 342, preventing the insert from being pushed all the way through the passageway from above. The shoulder 344 extends around the entire circumference of the passageway. Other types of stops may also be suitable.

When the insert 350 is positioned in the passageway 342, the shoulder 344 keeps the far end of the insert positioned so it extends beyond the bottom of the passageway 342 at a desired distance below the recessed bottom surface 360 of the chamber top unit 300, as seen in FIG. 3D. Depending on the size of the vials, the insert's opposite end 354 may extend beyond the top of the vials 180, as shown in FIGS. 1B and 1C.

In this example, the insert 350 has an outer diameter that allows it to be held in place by friction within the passageway, with a fit that is loose enough to allow the insert to be manually removed by pushing the insert upward from below. Other types of attachments may also be suitable.

The inner diameter can be chosen to ensure a sufficient amount of odor reaches the canine nose while still minimizing excess odor entering the environment. The extension of the insert 350 beyond the passageway 342 and into the primary mixing chamber can ensure substantial mixing of the component odors prior to reaching the secondary chamber. It may also be suitable to provide a kit of a number of different inserts, each with a different inner diameter and/or length. A particular insert can be selected that provides a desired concentration of mixed vapor to the upper chamber for a particular application. An insert with a narrower hollow center will decrease the total vapor concentration output. Removal of the insert would discourage complete mixing of the odor components.

Figure 6A:
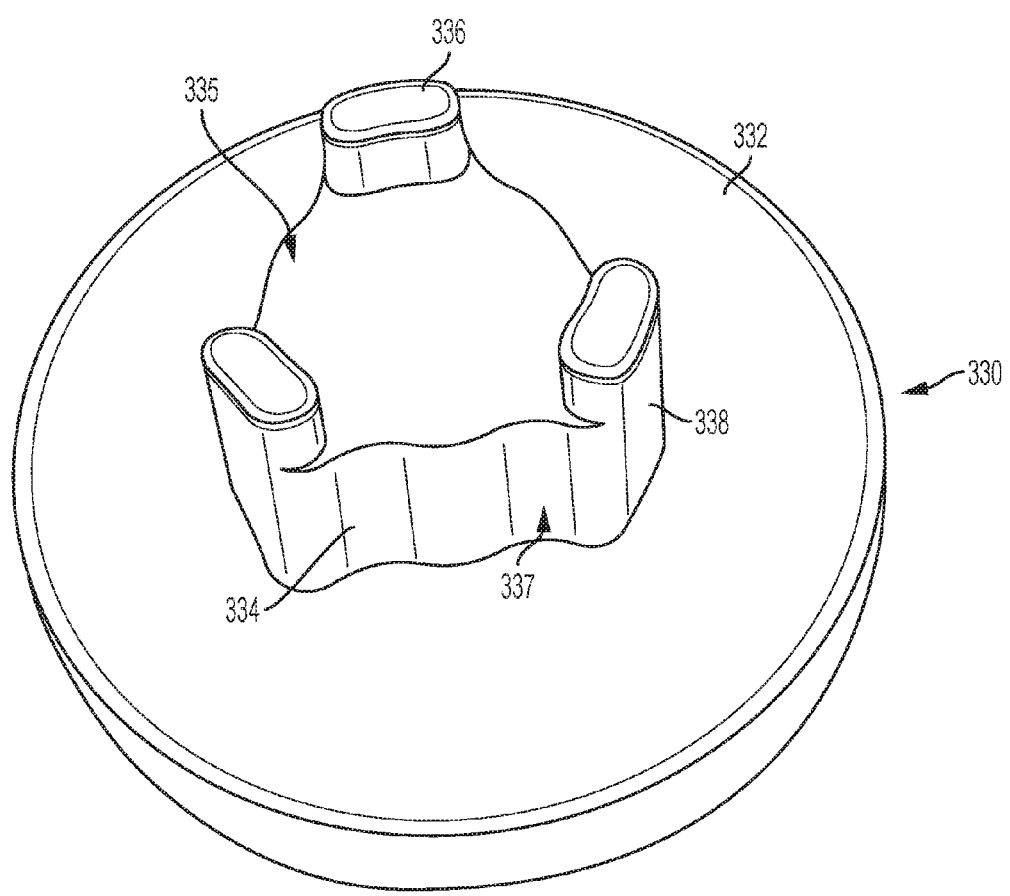
FIG. 6A-6C show a restrictor plug component of a mixed odor delivery device.
Figure 6B:
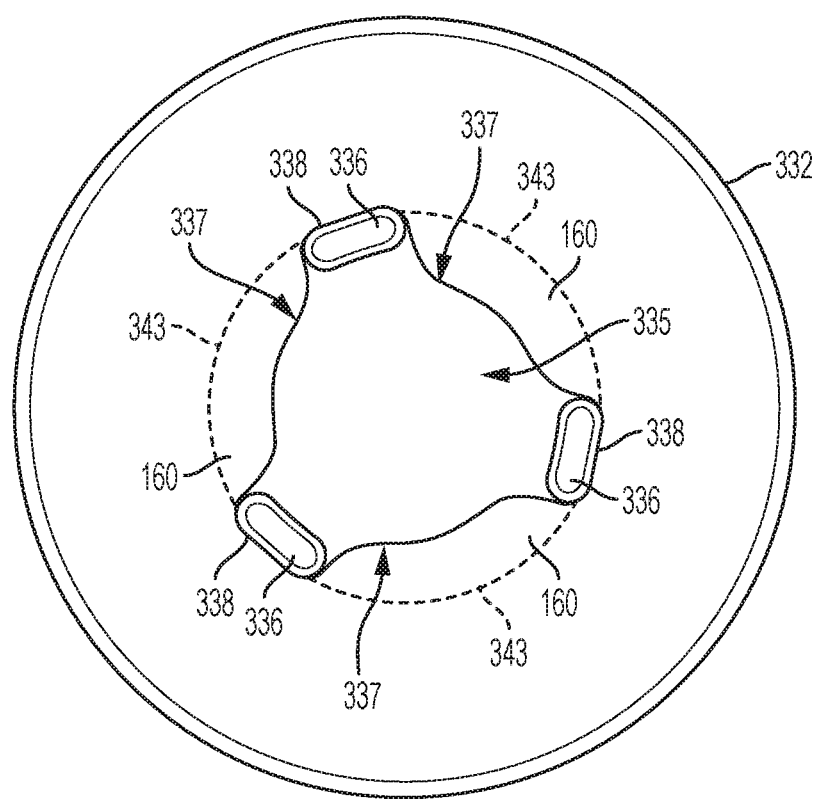
Figure 6C:
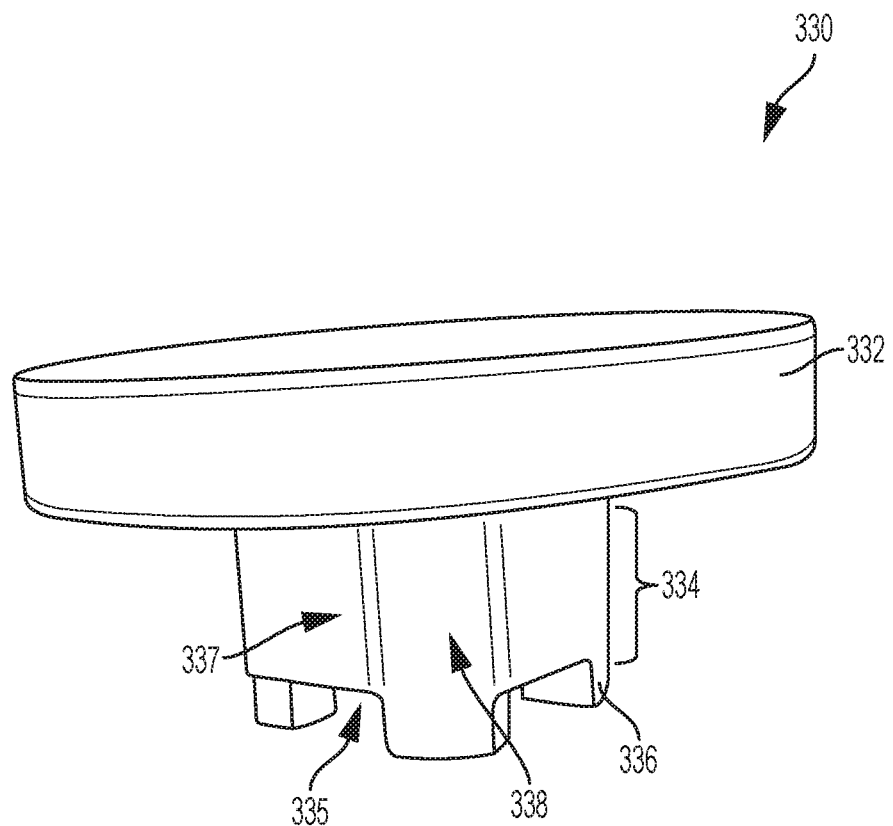

FIGS. 6A, 6B, and 6C illustrate a flow restrictor 330. The flow restrictor 330 works in conjunction with the insert 350 to pass the vapors from the lower, primary vapor mixing chamber 110 to the upper, secondary vapor mixing chamber 120.

The flow restrictor 330 has a generally cylindrical solid cap 332 at one end. A lower portion 334 has a smaller diameter than the cap portion, and is sized to fit within the passageway. The flow restrictor's lower portion 334 has several curved vertical surfaces 338 at its outer diameter. In this example, the vertical surfaces 338 are shaped to match the curvature of the inside cylindrical surface of the passageway 342 through the top unit 300. The flow restrictor 330 can be sized so that it is held in place by friction between the vertical surfaces of the flow restrictor and the inner cylindrical surface of the passageway through the chamber top unit. The fit between the flow restrictor 330 and the chamber top 300 is such that the flow restrictor can be removed by manually pulling the upper part upward, or by manually pushing the insert 350 upward to dislodge the flow restrictor 330. Other types of attachments may also be suitable.

Between each of the vertical surfaces 338 is a recessed contoured surface 337 that extends from the lower planar surface 335 of the flow restrictor to the solid cap portion 332. As seen in FIG. 6D, the recessed contoured surfaces 337 curve inward from the outermost diameter of the lower portion 334 to form several vertical flow conduits 339 between the flow restrictor and the inner cylindrical diameter 343 of the passageway 342. Three legs 336 extend downward beyond a the flow restrictor's lower planar surface 335.

The flow restrictor 330 can be positioned in the passageway so the legs 336 rest on the upper end of the insert 350 or on a shoulder 344 of the passageway 342, leaving a space 150 under the flow restrictor's lower planar surface 335 through which the vapors can pass from hollow center of the cylindrical insert into the vertical flow conduits 160.

The height of the lower portion of the flow restrictor 330 is such that a gap 130 is formed between the lower surface 331 of the cap portion 332 and the upper surface 341 of the cylindrical protrusion 340 on the chamber top unit 300. In this example, the gap 130 is cylindrical in shape and extends radially outward without obstruction. In this example, the cap portion 332 of the flow restrictor 330 is held in position by the legs and/or friction between the lower portion and the passageway, so in the gap region 130, there is no obstruction to radially outward diffusion of the mixed vapors from the vertical flow conduits 160 into the secondary vapor mixing chamber 120.

Figure 1D:
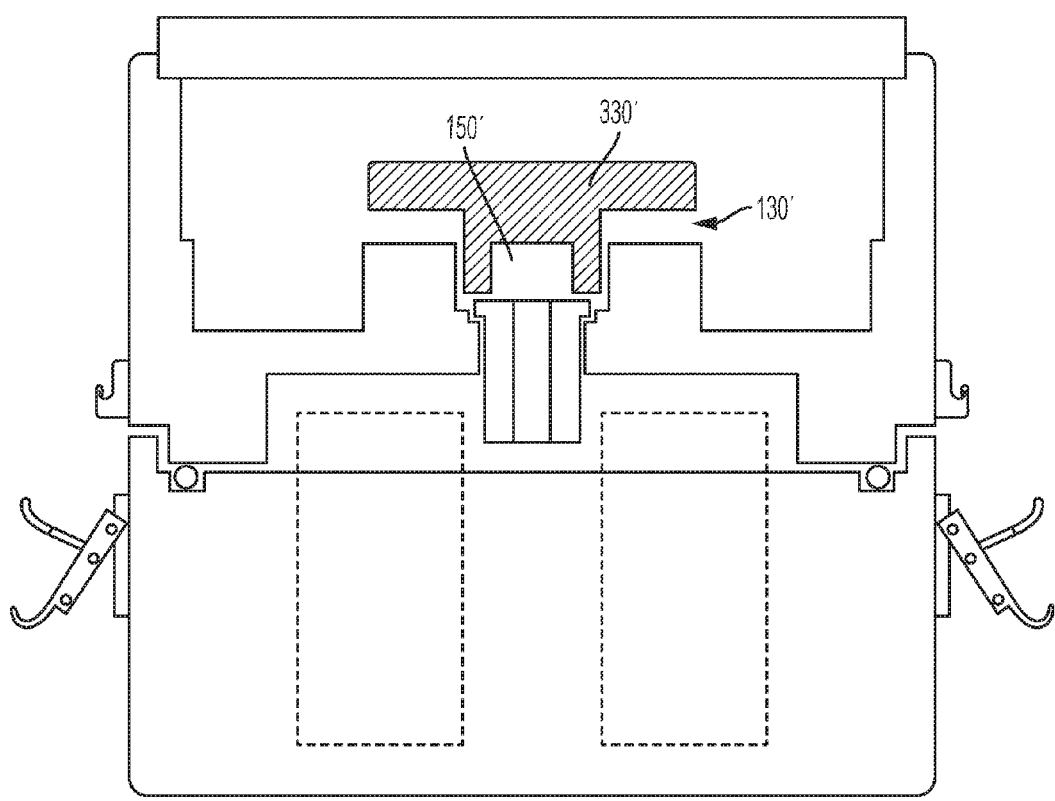
FIG. 1D is a cross sectional view of the mixed odor delivery device with a flow restrictor having longer legs, adapted to allow more vapor diffusion.

The length of the legs 336 controls the size of the space 150, which limits the diffusion of the odors, allowing a given concentration of mixed odor to reach the secondary chamber. In one embodiment, the device includes several restrictor plugs 330, each of which has a different leg length, so that using a particular one of the restrictor plugs provides a desired amount of total odor concentration output. The handler can select and use the appropriate restrictor plug for a particular application. FIG. 1B illustrates the device 100 with a flow restrictor 330 with shorter legs, and FIG. 1D illustrates the device 100 with a flow restrictor 330' with longer legs. The resulting space 150' and gap 130' in FIG. 1D are larger than the corresponding space 150 and gap 130 in FIG. 1B, allowing a higher odor concentration output.

Referring again to FIG. 1C, the mixed vapors escape from the vials and mix in the chamber 110 formed between the top unit and the base unit. The partially mixed vapors diffuse under the lower edge of the insert and into the central hollow region extending through the insert, diffuse upward through the insert, then are redirected outward by the bottom surface of the flow restrictor in the space 150. The vapors then diffuse upward in the flow conduits 160 formed between the sides of the flow restrictor and the inner cylindrical diameter 343 of the passageway 342 through the top unit 300. The vapors then are directed radially outward in the gap 130 and into the second mixing chamber 120 by the bottom of the cap portion of the flow restrictor.

In one example, the outer dimensions of the mixed odor delivery device 100 are approximately 5 inches by five inches by 4½ inches tall. The mixing chamber 110 formed in the underside of the chamber top is about 3 inches wide at its narrowest point, about 4¾ inches across at its widest diagonal direction, and about ½ inch deep. Each vial well is approximately 1⅜ inch deep and 1³⁄₁₆ inches in diameter. The upper mixing chamber 120 has dimensions of about 4 inches by 4 inches by 1⅛ inch deep. The insert 350 shown in FIG. 5 has an outer diameter of about ¾ inches, is approximately one inch in length, and has an inside diameter of about ½ inch. The resulting overall internal volume of the device 100 is about 32 cubic inches. Smaller or larger devices can also be suitable, depending on the particular application.

In some applications, the components of the system can be formed of polyvinyl chloride (PVC). PVC readily adsorbs volatile vapors, thus limiting the vapor concentration at the outlet and minimizing dispersion into the environment. Alternatively, polytetrafluoroethylene (PTFE) or a polymer with similar material and chemical properties may be suitable. PTFE resists adsorption of volatile materials. Both PVC and PTFE are easily cleaned, so that little or no odor residue will affect subsequent uses of the system. In the example discussed above, the chamber base unit, top unit, lid, and cap are formed of PVC, and the insert is formed of PTFE. When formed of PTFE and PVC, the system weighs less than 5 pounds, is rugged and compact for transportation.

In this example, each of the chamber base, top, lid, and cap can be formed of a single piece of material. In this embodiment, the only seams are the clamped o-ring seal between the chamber base and top units and the magnetic seal between the chamber top unit and the lid. The density and thickness of the components that surround the vapor further reduces the loss of vapors to the environment.

The system can be used to train canines for detecting scents of materials other than explosives. As one example, the system can be used to train canines to detect an illegal drug in the presence of a distracter (e.g., orange peels).

The device 100 can also be configured with a water jacket in the base unit 200 and/or top unit for heating or chilling the device and the substances in the vials or jars.

It may also be suitable to use the device without vials or jars in the vial recesses, by placing the substances directly in the recesses. If the substances to be tested are liquid, a sorbent pad or cloth can be soaked in a liquid and the pad or cloth can be placed in the vial well or a vial, to avoid spills due to canines knocking the device over.

In other embodiments, the chamber top unit is formed of a single piece that takes the place of the chamber top unit, the insert, and the flow restrictor. However, such a device will not allow adjustment by swapping out the flow restrictor piece.

It may also be suitable in some circumstances to use the device with just the chamber base unit and the chamber top unit, without the insert, flow restrictor, and lid. However, the relatively wide passageway 342 will allow the vapor to diffuse rapidly, with little mixing of the odors, creating a non-symmetric odor distribution.

Figure 7A:
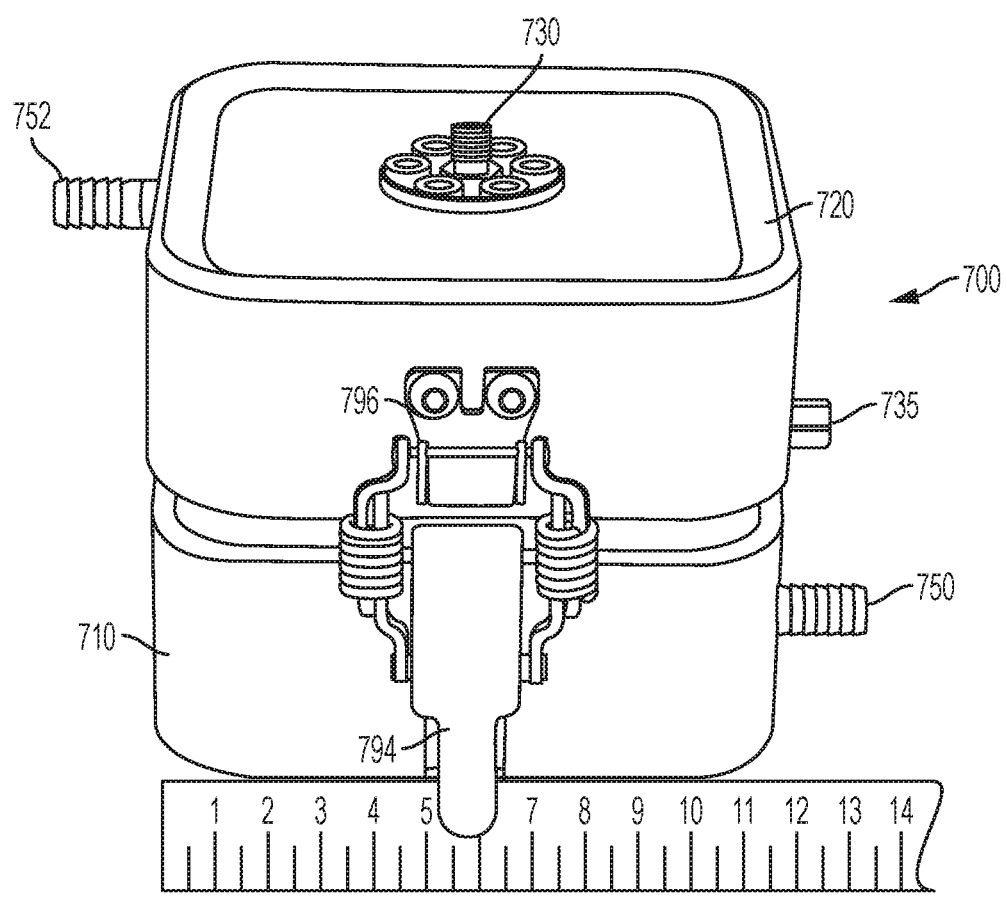
FIGS. 7A and 7B illustrate a mixed odor deliver device with active air flow and a water jacket for heating or cooling.
Figure 7B:
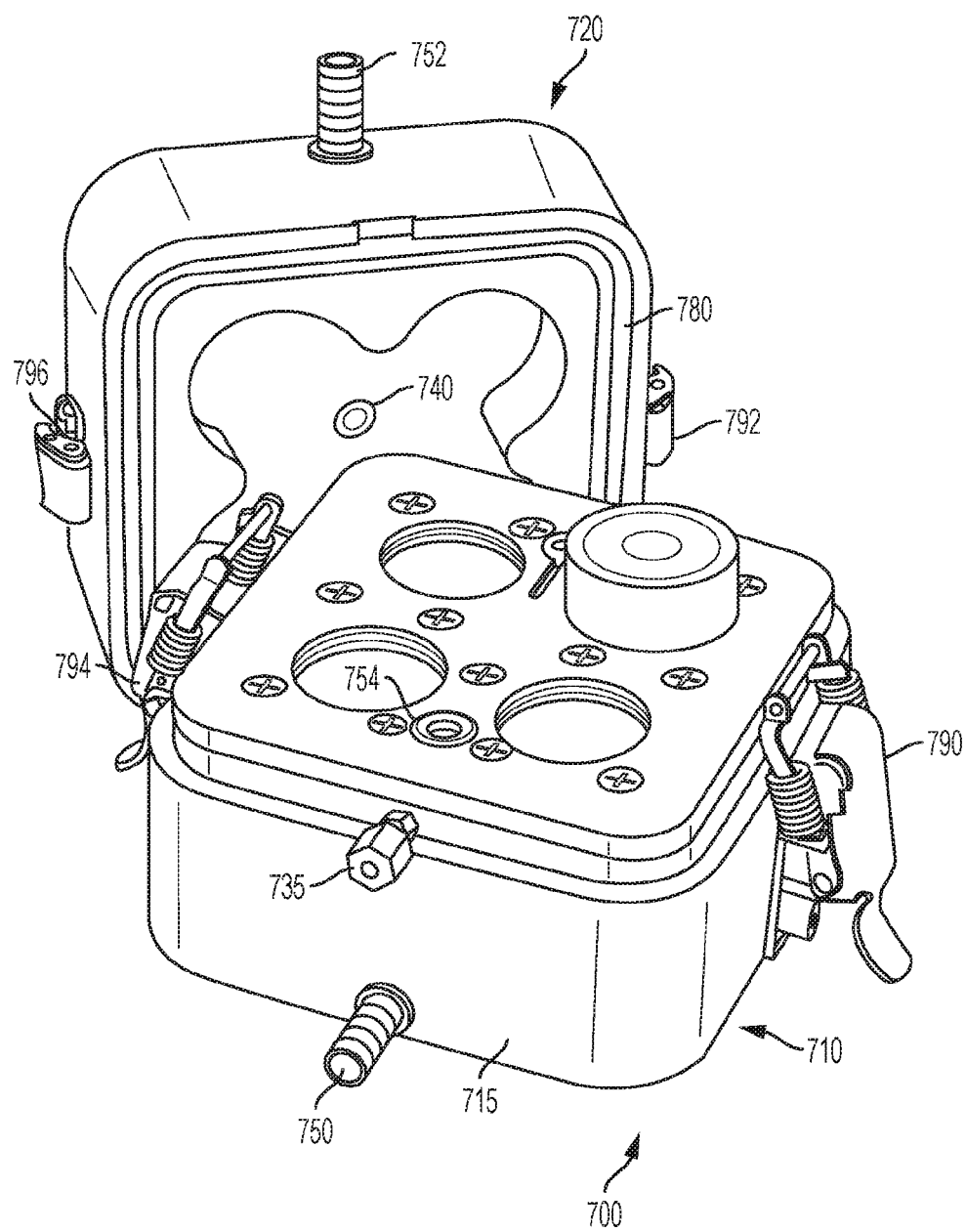

FIGS. 7A and 7B illustrates an active sampling mixed odor delivery device 700. This device includes a chamber base unit 710 with vial wells, a chamber top unit 720 that includes an integral lid, a passageway through the top unit that allows vapor to diffuse between the mixing chambers, and an o-ring seal system 780 with closure latch components 790, 792, 794, 796. In this system, air from an outside source is pumped into an inlet 750 and passes into the air spaces in the base 710. As the air moves through the primary vapor mixing chamber in the chamber base unit 710, it is pumped upward through a passageway 740 in the top unit 720. A port 730 for a vapor retrieval line is positioned in the top surface of the top unit 720, with the vapor retrieval line carrying the vapors to a sensor or instrument.

In this example, a water jacket can be located with inlet and outlet ports for chilling or heating the device, the inlet air, and the odor components. Here, an inlet port 750 in the chamber base allows water to flow through an internal fluid conduit in the chamber base 710. The conduit in the chamber base mates to an internal fluid conduit in the chamber top unit 720. An o-ring seal 754 prevents leakage from the fluid conduits into the mixing chamber by compressing the o-ring in a groove when the closure latches are closed. The outlet port 752 in the top unit 720 allows the liquid to exit from the device.

Figure 8A:
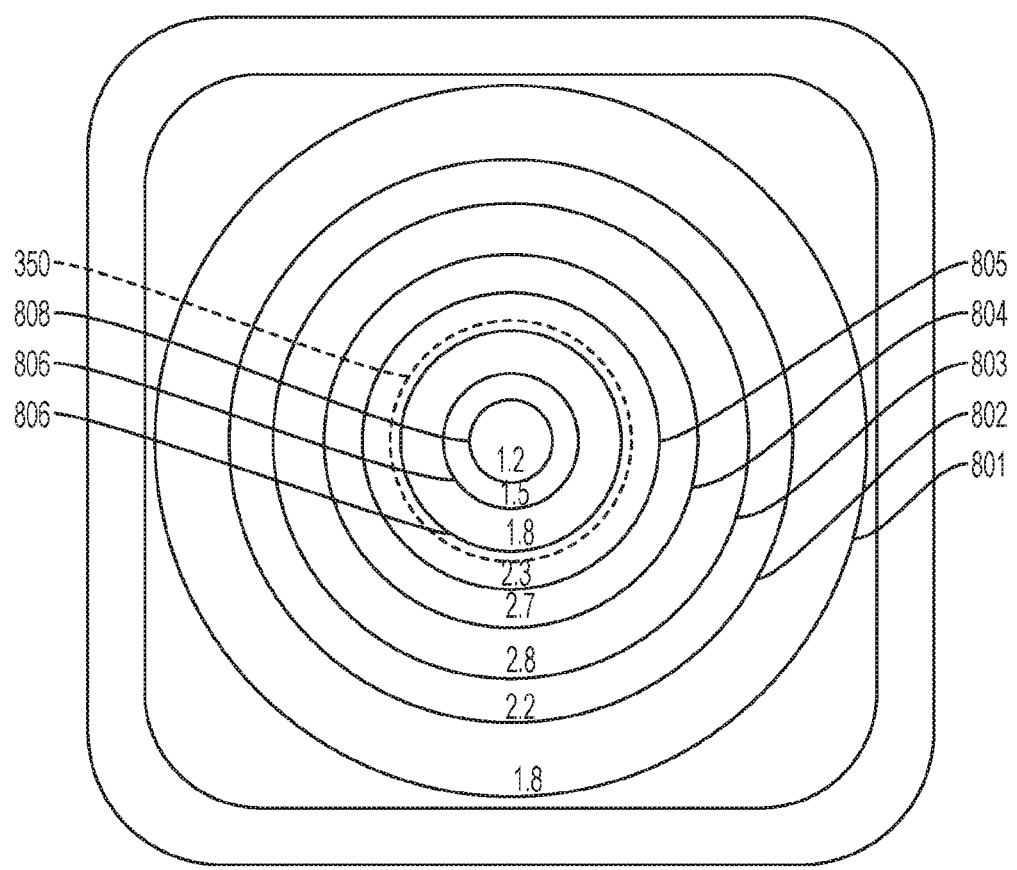
FIGS. 8A and 8B show vapor distribution at the outlet of a mixed odor delivery device with and without a flow restrictor, respectively.
Figure 8B:
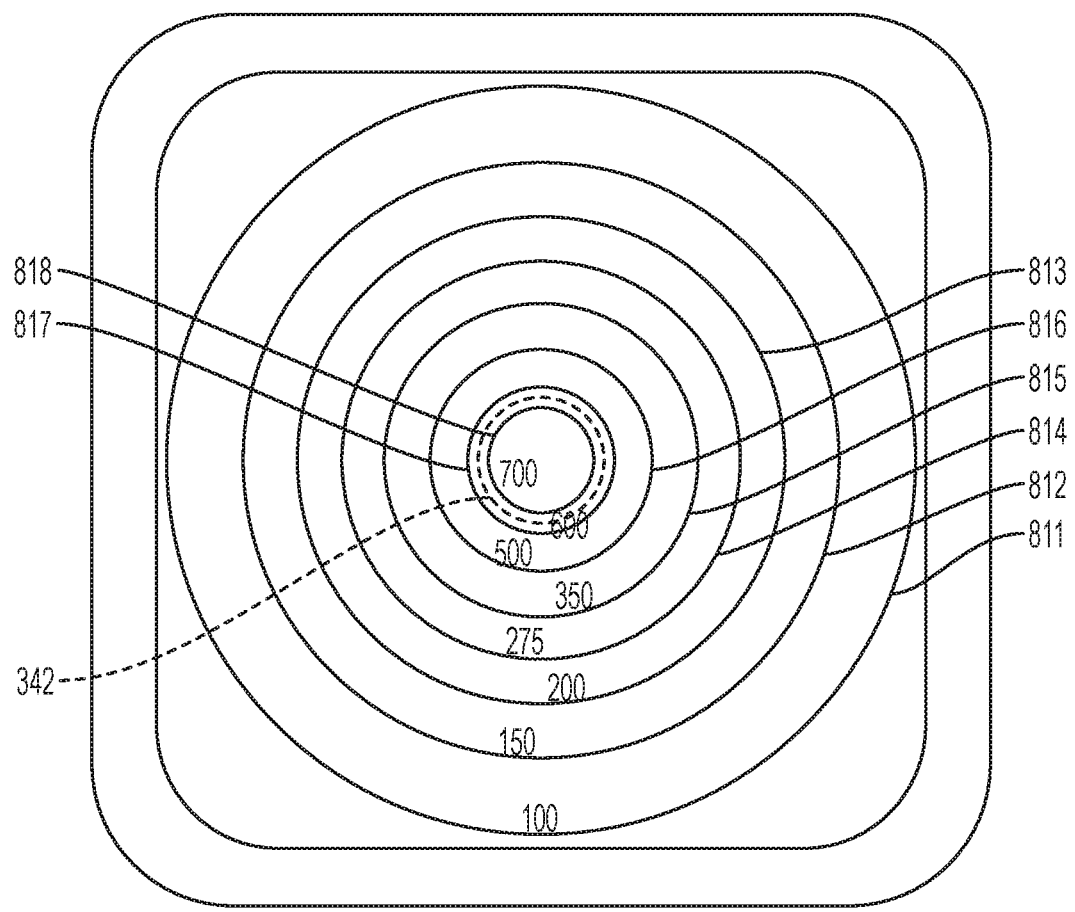

FIGS. 8A and 8B show the modeled vapor distribution profile of a vapor plume created by the device shown in FIG. 1A-1C above. Circular lines 801-808 are drawn over a top view of the device 100 to illustrate the vapor distribution profile. The modeled relative vapor distribution profile shown in FIG. 8A assumes a sample vial with a 2 gram sample of dinitrotoluene (DNT) was placed in one of the vial wells, and a period of 30 minutes was allowed to elapse. The unitless vapor concentrations range from 1.8 to 1.2 along the circular lines 801 through 808. The outline of the flow restrictor cap 332 is shown as a dotted line. FIG. 8B shows the results of modeling the device 100 performance without the flow restrictor. The outline of the passageway 342 through the chamber top 300 is shown as a dotted line. Circular lines 811-818 are drawn over a top view of the device 100 to illustrate the vapor distribution profile Both figures illustrate a symmetrical distribution of odor, which indicates that odor components would be well mixed by the device. The numbers shown on the figures indicate a unitless odor concentration in each region. By comparing FIGS. 8A and 8B, is seen that the system with the restrictor plug greatly lowers the odor concentration and more uniformly diffuses the mixed odors across the surface area.

3. Conclusions

The system described and claimed has several beneficial aspects. The devices 100 and 700 each have a much smaller overall internal volume than the system shown in U.S. Pat. No. 9,049,845. The smaller volume results in less dilution of the vapor in air, with a resulting higher vapor concentration in the vapor plume at the outlet thus requiring a lower mass of training material. The system described herein also provides minimal odor loss by permeation to the environment, because the materials allows absorption of the explosive components. As described above, the system is formed of materials that are easily cleaned of any odorants, and the system is rugged and easy to use and transport. The adjustable flow restriction provides a controllable vapor concentration.

The Detailed Description of the Exemplary Embodiments has revealed the general nature of the present disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed as new and desired to be protected by Letters Patent of the United States is:

1. An apparatus for generating a mixed vapor comprising first and second vapors from first and second separated material components, the apparatus comprising:
   a chamber base unit having at least two recesses configured to hold the first and second separated material components;
   a chamber top unit having a first side facing the chamber base and a second side opposite the first side;

the first side of the chamber top unit and the chamber base unit defining a primary vapor mixing chamber in fluid communication with the recesses;

a mechanical seal between the chamber top unit and the chamber base unit;

the chamber top unit having a passageway extending from the primary vapor mixing chamber to the second side of the chamber top unit, wherein the mixed vapor diffuses from the primary vapor mixing chamber through the passageway to the second side of the chamber top unit; and a flow restrictor provided on the second side of the chamber top unit, wherein the flow restrictor has a cap at a first end, a second end extending into the passageway, and a recessed portion in the second end that maintains a fluid conduit through the flow restrictor and the passageway to the second side of the chamber top unit.

2. The apparatus according to claim 1, wherein the mechanical seal includes an o-ring positioned between opposed sealing surfaces on the chamber top unit and the chamber base unit and radially outward of the primary mixing chamber, and at least one mechanical latch configured to urge the sealing surfaces together and to hold the chamber base unit and the chamber top unit together.

3. The apparatus of claim 1, further comprising:
a tube configured to be positioned within the passageway with a first end extending into the primary vapor mixing chamber.

4. The apparatus of claim 3, wherein the tube is cylindrical, and wherein a second end of the tube has a lip adapted to rest on a shoulder within the passageway.

5. The apparatus of claim 3, wherein the second end of the flow restrictor has a diameter configured to fit within the passageway, and wherein the cap has a wider diameter that extends radially outward past the circular upper edge of the passageway.

6. The apparatus of claim 3, wherein the flow restrictor comprises a plurality of fluid conduits that extend from the second end to the cap, and wherein a gap is formed between the cap and the second side of the chamber top unit, such that vapor can diffuse from the mixing chamber through the tube, through the fluid conduits, and through the gap to the second side of the chamber top.

7. The apparatus according to claim 1, wherein a recess in the second side of the chamber top unit forms a secondary vapor mixing chamber in fluid communication with the passageway and the primary vapor mixing chamber.

8. The apparatus according to claim 7, further comprising:
a lid configured to cover the recess in the second side of the chamber top unit.

9. The apparatus according to claim 8, further comprising:
at least one magnetic catch for removably holding the lid over the recess.

10. The apparatus according to claim 7, further comprising:
an air inlet at an outside surface of the chamber base unit providing air flow from outside the apparatus into the primary vapor mixing chamber; and
an air outlet at an outside surface of the chamber top unit providing air flow out of the secondary vapor mixing chamber.

11. The apparatus according to claim 1, further comprising:
a water jacket in at least one of the base unit and the top unit configured to heat or cool the apparatus with warmer or cooler water.

12. An apparatus for training canines to detect a mixed vapor comprising first and second vapors from first and second separated material components, the apparatus comprising:
a chamber base unit having at least two recesses configured to hold the first and second separated material components;
a chamber top unit having a first side facing the chamber base and a second side opposite the first side;
the first side of the chamber top unit and the chamber base unit defining a primary vapor mixing chamber in fluid communication with the recesses;
the chamber top unit having a passageway extending from the primary vapor mixing chamber to the second side of the chamber top unit, wherein the mixed vapor diffuses from the primary vapor mixing chamber through the passageway to the second side of the chamber top unit;
a tube configured to be positioned within the passageway with a first end extending into the primary vapor mixing chamber; and
a flow restrictor having a first end with a cap having a diameter that extends radially outward beyond an outer diameter of the passageway, the flow restrictor having a second end with a diameter configured to fit within an inner diameter of the passageway, where the second end comprises a recessed portion that maintains a fluid conduit through the flow restrictor and the passageway, and where the second end of the flow restrictor is configured to form a gap between the cap of the flow restrictor and the passageway.

13. The apparatus of claim 12, further comprising:
an air inlet at an outside surface of the chamber base unit providing air flow from outside the apparatus into the primary vapor mixing chamber; and
an air outlet at an outside surface of the chamber top unit providing air flow out of a secondary vapor mixing chamber formed by a recess in the second side of the chamber top unit.

14. The apparatus according to claim 12, further comprising:
a water jacket in at least one of the base unit and the top unit configured to heat or cool the apparatus with warmer or cooler water.

15. The apparatus of claim 12, wherein the tube is cylindrical, and wherein a second end of the tube has a lip adapted to rest on a shoulder within the passageway.

16. The apparatus of claim 12, wherein the flow restrictor comprises a plurality of fluid conduits that extend from the second end to the cap, such that vapor can diffuse from the primary vapor mixing chamber through the hollow tube, through the fluid conduits, and through the gap to the second side of the chamber top.

17. The apparatus of claim 12, wherein the second end of the flow restrictor has a friction fitting with the passageway.

18. An apparatus for generating an odor mixture developed from at least two separated material components, the apparatus comprising:
a chamber base unit having at least two vial wells configured to hold the separated material components;
a chamber top unit having a first side facing the chamber base and a second side opposite the first side;
the first side of the chamber top unit and the chamber base unit defining a primary vapor mixing chamber in fluid communication with the vial wells;
the chamber top unit having a passageway extending from the primary vapor mixing chamber to the second side of the chamber top unit and allowing vapors to diffuse from the vial wells to the second side of the chamber top;
a tube configured to be positioned within the passageway with a first end extending into the primary vapor mixing chamber; and
a flow restrictor having a first end with a diameter configured to fit within the passageway, and having a cap with a wider diameter at a second opposite end that extends radially outward past the circular upper edge of the passageway,
wherein the flow restrictor forms a plurality of flow conduits that extend from the first end to the cap, and wherein a gap is formed between the cap and the chamber top unit, such that vapor can diffuse from the mixing chamber through the tube, through the flow conduits, and through the gap to the second side of the chamber top.

19. The apparatus of claim 18, wherein the flow restrictor has a friction fitting with the passageway surface.

20. The apparatus of claim 18, wherein the flow conduits are formed between the inner diameter of the passageway and vertical recessed portions of the first end of the flow restrictor.

21. The apparatus of claim 18, further comprising:
a plurality of flow restrictors, such that one of the flow restrictors is positioned in the passageway, each flow restrictor having a first end with a diameter configured to fit within the passageway, and each flow restrictor having a cap with a wider diameter at a second opposite end that extends radially outward past the circular upper edge of the passageway, the first end having a plurality of legs that extend longitudinally and in use, the legs rest on the lip of the insert, each flow restrictor having a different leg length, such that the use of a flow restrictor with a particular leg length controls a rate of vapor diffusion through the flow conduits and the gap.

* * * * *